M. D. GREENWOOD.
Chain-Link.

No. 228,063.  Patented May 25, 1880.

Witnesses:
W. B. Masson
W. E. Bowen

Inventor:
Marstin D. Greenwood
by E. E. Masson,
atty.

UNITED STATES PATENT OFFICE.

MARSTIN D. GREENWOOD, OF HOOSICK FALLS, NEW YORK.

CHAIN-LINK.

SPECIFICATION forming part of Letters Patent No. 228,063, dated May 25, 1880.

Application filed February 11, 1880.

*To all whom it may concern:*

Be it known that I, MARSTIN D. GREENWOOD, of Hoosick Falls, in the county of Rensselaer and State of New York, have invented certain new and useful Improvements in Chain-Links and Chains, of which the following is a specification, reference being had to the accompanying drawings, in which—

Figure 1:
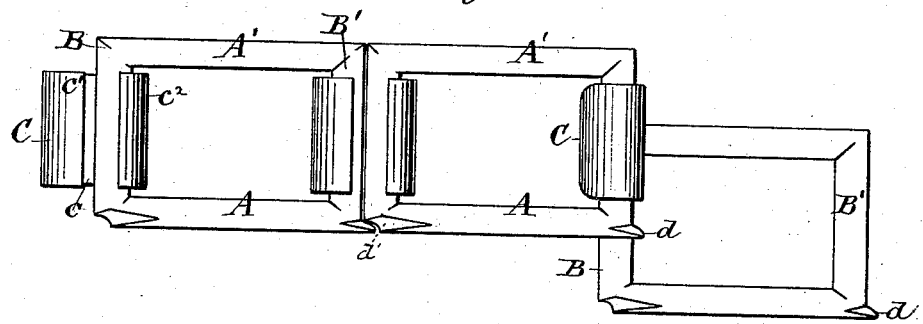
Figure 2:
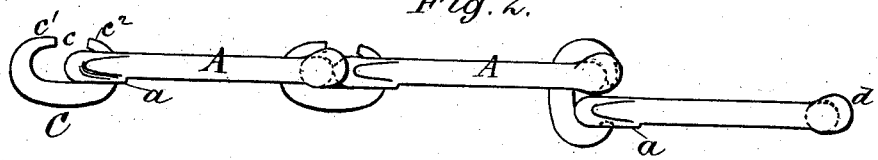
Figure 3:
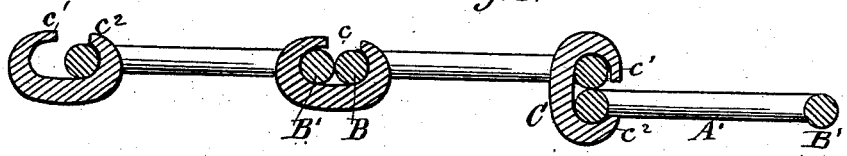
Figure 4:
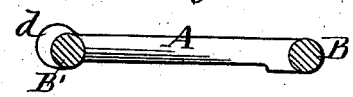
Figure 5:
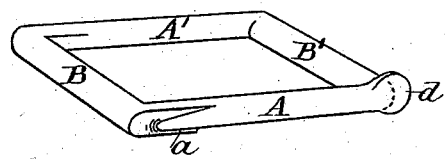

Figure 1 represents a top view of a portion of the chain with one of the links partly removed therefrom. Fig. 2 represents a side view of the chain with the links in the same position as in Fig. 1. Fig. 3 represents a longitudinal section of the same portion of the chain. Fig. 4 represents, in longitudinal section, one of the links, showing the opposite side from that shown in Fig. 3. Fig. 5 represents, in perspective, one of the links.

This invention relates to that class of sprocket-wheel chains in which the links are so constructed as to conveniently permit the removal or insertion of one or more links in the chain.

Heretofore the links of this class of chains have generally been made with a hook at one end and a transverse bar at the other, each link being long enough to receive the sprocket of the wheel, and cast with a connecting-hook, forming its extension. Others have been made with a short link alternating with, and connected immovably to, an open link.

The object of my invention is to produce a chain that can be used on sprocket-wheels of very small diameter, and in which the links can be readily disconnected without materially shortening the chain, said links being ready to be put together for use as they come from the malleable works or foundry, and do not require any bending or fitting. This chain is formed of rectangular links to receive the sprockets of wheels, with flattened C-shaped couplers, which form the bearings for the sprockets, the rectangular links being detachable from the latter.

My invention consists in a rectangular link having parallel side bars and cylindrical end bars of larger diameter than the side bars, the outer edge of one of said side bars being recessed at one end, and provided at the other end with a circular lip eccentric to the adjoining end bar and in line with the outer edge of said side bar, to form a continuous straight line with the outer edge of a similar link.

It consists, also, in a C-shaped coupler having hooks of unequal lengths to engage with rectangular links, as above mentioned.

In the drawings, A and A' represent the side bars, and B and B' the end bars, of the rectangular links. These end bars are cylindrical throughout their length; but they are of larger diameter than the side bars, and eccentric thereto, for a purpose that will be explained hereinafter.

C represents C-shaped couplers, slotted at $c$ to admit only the side bars, A', of the rectangular links. The slot $c$ is so located as to give to the coupler C two hooks, $c'$ and $c^2$, of unequal length, the hook $c'$ being twice the length of the hook $c^2$.

To connect the rectangular links to the coupling-link $c$ the latter is turned sidewise, substantially as shown on the right side of Figs. 1, 2, and 3, and the bar A' is passed through the slot $c$, the end bar, B', being received by the long hook $c'$. The end bar, B, of another similar rectangular link is then introduced endwise under the end bar, B', of the first link, within the short hook $c^2$, and slid along the semicircular groove within said hook until arrested by the projection $a$ on the under side of the side bar, A. The two rectangular links thus united are then pulled in line, and form, with the coupler-link C, a short but complete portion of the new chain.

To retain these links securely united against accidental displacement, one end of the side bar, A, is provided with a nearly circular lip, $d$, adjacent to the end bar, B', but of larger diameter, and eccentric thereto. To produce a rectangular link with a large central opening and its periphery free of outer projections likely to interfere with pulleys or other mechanism with which they may come in contact, this lip $d$ is made to extend in line with the outer edge of the link, and does not project either above or below the plane of the link C, the purpose of this lip being to retain two adjacent rectangular links united and incapable of being disconnected, except when in a predetermined position, as it locks the adjoining link by engaging into a depression, $d'$, formed adjacent to the end bar, B. This depression or removal of metal at $d'$ does not weaken the rectangular link at that point, as it is re-enforced immediately adjacent thereto by the projection $a$, that is acting also as a preventive against the accidental disconnection of the links.

With rectangular links made as above described it is imperative that one of the hooks of the coupling-link C should be longer than the other, to give to the chain the greatest safety.

It is evident that the hook $c'$ may be made shorter than shown now, but then the slot $c$ would be too large and the links too easily disconnected, and would fall apart under many circumstances where they are now secure under my construction.

I am aware that rectangular chain-links have been provided with a hook at one end and a slotted or flattened bar at the other, and also with lugs on each side projecting laterally therefrom, requiring more slack of chain and width of pulley or side space than necessary with my links, as shown and described.

I am aware that it is not new to construct a chain-link the side bars of which are provided with cams or eccentrics, and such I do not claim, broadly, as my invention.

Having now fully described my invention, I claim—

1. A rectangular chain-link having parallel side bars and cylindrical end bars of larger diameter than the side bars, the outer edge of one of said side bars being recessed at one end, and provided at the other end with a circular lip eccentric to the adjoining end bar, and in a continuous straight line with the outer edge of said side bar, substantially as and for the purpose described.

2. A flattened or C-shaped coupling-link, C, slotted at $c$, and having hooks $c'$ and $c^2$ of unequal length, substantially as and for the purpose described.

3. The combination of a rectangular link having side bars, A and A', cylindrical end bars, B and B', of larger diameter than said side bars and cast therewith, the side bar, A, having a recess at one end and a lip, $d$, at the other end, said lip being eccentric to one of the end bars, and in a continuous line with the outer edge of the link, with a coupling-link, C, slotted at $c$, and having hooks $c'$ and $c^2$ of unequal length, substantially as and for the purpose described.

MARSTIN D. GREENWOOD.

Witnesses:
J. F. PETERS,
WM. M. ARCHIBALD.